United States Patent
Witzel et al.

(10) Patent No.: US 9,584,574 B2
(45) Date of Patent: Feb. 28, 2017

(54) WIDEBAND CODEC NEGOTIATION

(75) Inventors: Andreas Witzel, Herzogenrath (DE); Dirk Kampmann, Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1184 days.

(21) Appl. No.: 12/281,459

(22) PCT Filed: Mar. 2, 2006

(86) PCT No.: PCT/EP2006/001899
§ 371 (c)(1), (2), (4) Date: Nov. 17, 2008

(87) PCT Pub. No.: WO2007/098783
PCT Pub. Date: Sep. 7, 2007

(65) Prior Publication Data
US 2009/0076802 A1    Mar. 19, 2009

(51) Int. Cl.
H04L 29/06    (2006.01)
H04W 88/18    (2009.01)

(52) U.S. Cl.
CPC ........ H04L 65/605 (2013.01); H04L 65/1069 (2013.01); H04L 65/1083 (2013.01); H04W 88/181 (2013.01)

(58) Field of Classification Search
CPC .......... H04L 65/1066–65/1096; H04L 65/60–65/608; H04L 65/80; H04W 88/181
USPC .......... 370/229–231, 235, 236, 252, 401, 370/464–468, 477; 709/227–235, 246, 709/247, 249
See application file for complete search history.

(56) References Cited

U.S. PATENT DOCUMENTS

| | | | |
|---|---|---|---|
| 6,671,367 B1* | 12/2003 | Graf et al. | 379/229 |
| 6,832,088 B1 | 12/2004 | Stumpert | |
| 7,751,359 B1* | 7/2010 | Bienn et al. | 370/328 |
| 8,199,727 B1* | 6/2012 | Bienn et al. | 370/335 |

(Continued)

FOREIGN PATENT DOCUMENTS

| | | |
|---|---|---|
| EP | 1 307 036 A1 | 5/2003 |
| WO | 2005002264 A | 1/2005 |

(Continued)

OTHER PUBLICATIONS

3GPP TS 23.153 V7.1.0 3rd Generation Partnership Project; Technical Specification Group Core Network and Terminals; Out of band transcoder control; Stage 2 (Release 7), Dec. 2005.

*Primary Examiner* — Timothy J Weidner (57) ABSTRACT

The invention proposes several methods for codec handling. In specific, methods involving providing a supported codec list of a Call Control Server are described. A node receives information, whether a terminal supports a wideband codec, wherein the information is received in call set up signaling from the terminal of the subscriber. Furthermore, configuration information is retrieved, whether a Radio Access Node supports the wideband codec. Additionally, information is retrieved, whether a media gateway supports the wideband codec, wherein the information is either provided by the operator or retrieved from the media gateway (MGW1, MGW2, MGWx). The information is analyzed and in response to the analysis a supported codec list is provided. Furthermore, alternative embodiments and devices adapted for the methods are disclosed.

17 Claims, 1 Drawing Sheet

(56) References Cited

U.S. PATENT DOCUMENTS

| | | | |
|---|---|---|---|
| 8,208,413 B1 * | 6/2012 | Bienn et al. | 370/271 |
| 2002/0009997 A1 * | 1/2002 | Stuempert et al. | 455/439 |
| 2002/0142749 A1 * | 10/2002 | Muniere et al. | 455/403 |
| 2002/0163908 A1 | 11/2002 | Lakaniemi | |
| 2002/0181495 A1 * | 12/2002 | Requena et al. | 370/465 |
| 2003/0115332 A1 * | 6/2003 | Honeisen | 709/227 |
| 2003/0169768 A1 * | 9/2003 | Bienn et al. | 370/469 |
| 2004/0095958 A1 | 5/2004 | Ejzak et al. | |
| 2004/0240399 A1 * | 12/2004 | Corrao et al. | 370/260 |
| 2004/0254786 A1 | 12/2004 | Kirla et al. | |
| 2004/0264482 A1 * | 12/2004 | Kang et al. | 370/401 |
| 2005/0037790 A1 * | 2/2005 | Chang | 455/510 |
| 2005/0091392 A1 * | 4/2005 | Gesswein et al. | 709/231 |
| 2005/0232232 A1 * | 10/2005 | Farber et al. | 370/352 |
| 2006/0120356 A1 * | 6/2006 | Lee et al. | 370/352 |
| 2006/0174015 A1 * | 8/2006 | Arauz-Rosado | 709/228 |
| 2007/0153766 A1 * | 7/2007 | Bienn et al. | 370/352 |
| 2007/0165644 A1 * | 7/2007 | Rossler | 370/395.2 |
| 2007/0171841 A1 * | 7/2007 | Witzel et al. | 370/254 |
| 2010/0272072 A1 * | 10/2010 | Bienn et al. | 370/335 |
| 2013/0005316 A1 * | 1/2013 | Bienn et al. | 455/417 |

FOREIGN PATENT DOCUMENTS

| | | |
|---|---|---|
| WO | WO 2005/096585 A | 10/2005 |
| WO | WO 2005096585 A1 * | 10/2005 |

* cited by examiner

WIDEBAND CODEC NEGOTIATION

TECHNICAL FIELD

The present invention relates to a method for and to respective devices allowing for wideband codec negotiation.

BACKGROUND

Most speech coding systems in use today are based on telephone-bandwidth narrowband speech. The telephone-bandwidth is nominal limited to about 300-3400 Hz and sampled at a rate of 8 kHz. This limitation built into the conventional telephone system dates back to when the service was established. The inherent bandwidth limitations in the conventional public switched telephone network (PSTN) impose a limit on communication quality.

The increasing penetration of the end-to-end digital networks, such as 2G and 3G wireless systems, will permit the use of wider speech bandwidth that will offer communication quality that significantly surpasses that of the PSTN and creates the sensation of face-to-face communication.

In wideband speech coding (AMR-WB), the signal is for example sampled at 16 kHz, and the band is for example limited to 100-7000 Hz, which results in speech quality close to that of face-to-face communication.

Already today's networks support the Out of Band Transcoder Control (OoBTC) function for codec negotiation.

However, the negotiation so far supports only narrowband codec types and PCM.

OoBTC function provides an algorithm optimized to negotiate the best speech codec at call setup, providing improved Core Network bandwidth usage and improved speech quality.

International Patent application PCT/EP2004/002229 addresses the problem of how to provide optimal data quality and/or to minimize the bandwidth needs in the telecommunications core network and suggests an improved codec list handling for GSM/WCDMA networks.

There, the codec list was divided into a two part list, whereby one part comprises so-called "direct codecs", which are codecs that are supported by the terminal, the radio access network and the Media Gateway, where the radio access network is connected to, and the other part so-called "transcoding codecs" or "indirect codecs", which are supported by the Media Gateway, but not by the terminal or not by the RAN, and therefore afford transcoding in the Media Gateway. The list could be separated by a separator such as a common or default codec.

The invention adds to the improved codec list structure how a specific handling methods of a wideband codec could be implemented as well as corresponding handling logic.

Furthermore, as already stated, wideband codecs may offer superior speech quality when used end-to-end.

However, it has to be noted, that in order to achieve the improved speech quality, the wideband encoding algorithm typically requires in the order of 2-4 times more processing power of an encoding/decoding DSP than would be necessary for a narrowband codec.

Hence, in terms of processing power, a wideband codec is expensive.

However, the speech quality enhancements related to such a wideband codec are achieved only if the wideband codec is used end-to-end. Any narrowband link within the transmission path will lead to only a narrowband quality transported end-to-end.

It has also to be noted, that the call set-up may change during a call leading to a situation that the wideband codec would become available or would no longer be available.

SUMMARY

It is an object of the invention to obviate some of the above disadvantages and provide methods for and respective devices allowing for wideband codec handling thereby offering improved quality when possible.

A first proposed method is performed in a node such as a Call Control Server when setting up a call.

In the call set up signaling the node receives information, whether a terminal of a subscriber involved in the call supports a wideband codec, wherein the information is received in call set up signaling.

Furthermore, the node may retrieve configuration information, whether a Radio Access Node supports the wideband codec.

Also, the node may retrieve information, whether a media gateway supports the wideband codec. This information may be provided by the operator or retrieved from the media gateway.

The information, whether the terminal supports the wideband codec, the configuration information, whether the Radio Access Node supports the wideband codec, and the information, whether a media gateway supports the wideband codec are analyzed.

In response to the analysis a supported codec list is provided, which may be used internally and/or send towards another node, such as an intermediate or a terminating node.

If the media gateway does not support the wideband codec, the codec will not be included in the supported codec list. Also, if the terminal does not support the wideband codec, the codec will not be included in the supported codec list.

However, if the media gateway supports the wideband codec and if the terminal supports the wideband codec, the wideband codec is included in the supported codec list.

The way the wideband codec is included is specified by the support of the Radio Access Node, i.e. if the Radio Access Node does not support the wideband codec, the wideband codec is included as an indirect codec in the supported codec list, otherwise if the Radio Access Node supports the wideband codec, the wideband codec is included as a direct codec in the supported codec list.

The Method may take into account further information, such as whether the subscriber is allowed to use the wideband codec, and/or whether the usage of the wideband codec is temporally disallowed. The information on the subscriber may be retrieved from a database whereas the information on the allowed/disallowed usage may be included in configuration information.

The aforementioned methods may additional comprise a step of receiving a supported codec list from an originating or an intermediate node. This receiving may even trigger the aforementioned methods.

Furthermore, a second proposed method for returning an available codec list for setting up a call or mid-call codec negotiation is performed in a node such as a Call Control Server. The node receives in a first step a supported codec list from an originating or an intermediate node. Then, the node provides an own supported codec list. Afterwards, the received supported codec list and the own provided supported codec list are analyzed.

In response to the analysis a codec is selected and an available codec list (ACL) is provided, which will be sent to the originating node.

If both supported codec lists comprise the wideband codec as a direct codec, said wideband codec is included in the available codec list and said wideband codec is selected.

If only one of the supported codec lists comprises the wideband codec as a direct codec while the other supported codec lists comprises the wideband codec as an indirect codec, said wideband codec is included in the available codec list but not selected.

If both supported codec lists comprise the wideband codec as an indirect codec, said wideband codec is neither included in the available codec list nor selected.

Furthermore, a third proposed method for returning an available codec list for setting up a call or mid-call codec negotiation is performed in a node such as a Transit Switching Center. The node retrieves configuration information from a service, whether the service supports a wideband codec.

Furthermore, the node retrieves information, whether a media gateway supports the wideband codec. This information is either provided by the operator or retrieved from the media gateway.

Afterwards, the information, whether the Service supports the wideband codec, and the information, whether a media gateway supports the wideband codec, are analyzed.

In response to the analysis a supported codec list is provided, which may be used internally and/or send towards another node, such as an intermediate, an originating or a terminating node.

The provided supported codec list does not comprise the wideband codec, if the media gateway does not support the wideband codec.

The provided supported codec list does not comprise the wideband codec, if the service does not support the wideband codec.

Furthermore, a fourth method for mid-call codec handling in a first node is proposed, whereby the node is logically connected to a second node in an ongoing call. The first node provides a first supported codec list, whereby the first supported codec list comprises a wideband-codec.

Furthermore, the node may receive or reconstruct a second supported codec list of the second node.

When a change in the setup of the first node is detected which makes the wideband codec available or unavailable as a direct codec in the end-to-end connection, a new supported codec list I provided, and the new supported codec list is send towards the second node.

Furthermore, Devices and Software adapted to perform the aforementioned methods are proposed.

BRIEF DESCRIPTION OF THE TABLES AND FIGURES

By means of the appended tables and figures the invention will now be described in detail.

In the following.

Tab. 1 shows how a wideband codec is included a supported codec list in different set ups according to the invention.

Tab. 2 shows how a wideband codec is included an available codec list in different set ups according to the invention.

Tab. 3 shows how an originating node may determine the capabilities of a terminating node in different set ups according to the invention.

DETAILED DESCRIPTION

The following description assumes adaptive multi-rate speech codec (AMR-WB) as wideband codec.

However, the methods and devices may also employed with respect to other codecs which should be used only End-To-End in order to avoid wasting of computation power.

Furthermore, although the term terminal is used in the following, any kind of device allowing for setting up a call could be employed such as for example a server.

In the following a handling of Wideband coded in an originating Call Control Server such as a MSC-Server is described.

When setting up a call in the originating Call Control Server (MSC 1), the originating Call Control Server (MSC 1) acts as the originating OoBTC node and has to build a Supported Codec List (SCL), which is sent in the OoBTC procedure towards the terminating Call Control Server (MSC 2). Such a set-up is reproduced in FIG. 1.

Figure 1:
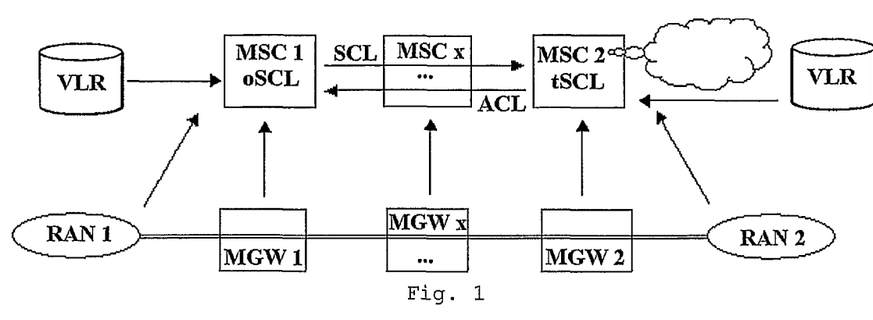
FIG. 1 shows a set-up according to the invention.

Before building the supported codec list (SCL), the originating Call Control Server (MSC 1) has to check which codecs are supported by other elements involved in the call.

These elements comprise the originating terminal (TE), the originating Radio Access Network (RAN 1) and the Media Gateway (MGW 1).

Specifically, does the originating terminal (TE) support a wideband codec (AMR-WB)?

This information (TE_sup) may be received from the terminal (TE) within the call setup signaling.

Furthermore, does the originating Radio Access Node (RAN 1), which is for example a Base Station Controller (BSC) in a GSM Network and a Radio Network Controller (RNC) in a WCDMA Network support the wideband codec (AMR-WB)?

This information (RAN_sup) may be checked from configuration information in the Call Control Server (MSC 1).

And furthermore, does the originating Media Gateway (MGW 1) support the wideband codec (AMR-WB)?

This information (MGW_sup) is either administered by the operator in the Call Control Server (MSC 1), or the Call Control Server (MSC 1) may obtain this information from the Media Gateway (MGW 1) for example via a H.248 Audit function.

The above information is analyzed. The analysis is performed according to table 1, which is organized in columns according to the support in the Terminal (TE_sup), the Radio Access Network (RAN_sup), the Media Gateway (MGW_sup) and the decision which is found in the last column.

If, for example, a wideband codec (AMR-WB) is supported by the Terminal (TE_sup=yes), the Radio Access Network (RAN_sup=yes) and the Media Gateway (MGW_sup=yes), then AMR-WB is supported end-to-end and consequently AMR-WB is included as a Direct Codec in the Supported Codec List (oSCL).

However, the case that the terminal (TE_sup=yes) and the MGW (MGW_sup=yes) support AMR-WB, but the radio access node does not (RAN_sup=no), requires special attention.

In this case, although AMR-WB is not available end-to-end initially, it might be possible that after a handover or a relocation the radio access node might change and therefore, AMR-WB might become available end-to-end.

For this reason, AMR-WB is included as indirect codec in the Supported Codec List (oSCL).

If however, the terminal and/or the MGW does not support AMR-WB, AMR-WB is not included in the Supported Codec List (oSCL).

So far, the Supported Codec List (oSCL) was handled internally in the Call Control Server (MSC 1).

This internal Supported Codec List (oSCL) is then sent as Supported Codec List (SCL) towards a terminating Call Control Server (MSC 2) in an OoBTC procedure at call setup. The term towards is meant to encompass also sending via intermediate Call Control Servers (MSC x) as indicated in FIG. 1.

As it is apparent from the above, if such a handling logic is present in the Call Control Server (MSC 1), it is assumed that the wideband codec (AMR-WB) is also supported in the Call Control Server (MSC 1).

However, there may be an additional flag in the Call Control Server (MSC 1) to deactivate AMR-WB usage for the whole node. Such a flag might be used to prohibit the use of the wideband codec in case of the Call Control Server being loaded. Such a flag may also be part of the configuration information.

Furthermore, it might even be possible to check whether the originating subscriber is allowed to use a wideband codec (AMR-WB). For example, prepaid customers could be excluded.

Such information may be available in the Visiting Location Register (VLR) and may be retrieved by the Call Control Server (MSC 1).

In the following a handling of Wideband codec (AMR-WB) in a terminating Call Control Server such as MSC-Server (MSC 2) is described with reference to FIG. 1.

When setting up a call in the terminating Call Control Server (MSC 2), the terminating Call Control Server (MSC 2) acts as the terminating OoBTC node and has to build an own Supported Codec List (tSCL), which is used in addition to the received supported Codec List (SCL) to select a codec to be used in the call. The set-up is reproduced in FIG. 1.

Before building the own supported codec list (tSCL), the terminating Call Control Server (MSC 2) has to check which codecs are supported by other elements involved in the call.

The building of the supported codec list (tSCL) may be provoked by receiving a supported codec list (oSCL) from an originating (MSC 1) or an intermediate node (MSC x).

These elements comprise the terminating terminal (TE), the terminating Radio Access Network (RAN 2) and the Media Gateway (MGW 2).

Specifically, does the terminating terminal (TE) support a wideband codec (AMR-WB)?

This information (TE_sup) may be received from the terminal (TE) within the call setup signaling.

Furthermore, does the terminating Radio Access Node (RAN 2), which is for example a Base Station Controller (BSC) in a GSM Network and a Radio Network Controller (RNC) in a WCDMA Network support the wideband codec (AMR-WB)?

This information (RAN_sup) may be checked from configuration information in the terminating Call Control Server (MSC 2).

And furthermore, does the terminating Media Gateway (MGW 2) support the wideband codec (AMR-WB)?

This information (MGW_sup) is either administered by the operator in the Call Control Server (MSC 2), or the Call Control Server (MSC 2) may obtain this information from the Media Gateway (MGW 2) for example via a H.248 Audit function.

The above information is analyzed. The analysis is performed according to table 1, which is organized in columns according to the support in the Terminal (TE_sup), the Radio Access Network (RAN_sup), the Media Gateway (MGW_sup) and the decision which is found in the last column.

If, for example, a wideband codec (AMR-WB) is supported by the Terminal (TE_sup=yes), the Radio Access Network (RAN_sup=yes) and the Media Gateway (MGW_sup=yes), than AMR-WB is supported end-to-end and consequently AMR-WB is included as a Direct Codec in the Supported Codec List (oSCL).

However, the case that the terminal (TE_sup=yes) and the MGW (MGW_sup=yes) support AMR-WB, but the radio access node does not (RAN_sup=no), requires special attention.

In this case, although AMR-WB is not available end-to-end initially, it might be possible that after a handover or a relocation the radio access node might change and therefore, AMR-WB might become available end-to-end.

For this reason, AMR-WB is included as indirect codec in the Supported Codec List (tSCL).

If however, the terminal and/or the MGW does not support AMR-WB, AMR-WB is not included in the Supported Codec List (tSCL).

The Supported Codec List (tSCL) will be handled internally in the Call Control Server (MSC 2).

As it is apparent from the above, if such a handling logic is present in the Call Control Server (MSC 2), it is assumed that the wideband codec (AMR-WB) is also supported in the Call Control Server (MSC 2).

However, there may be an additional flag in the Call Control Server (MSC 2) to deactivate AMR-WB usage for the whole node. Such a flag might be used to prohibit the use of the wideband codec in case of the Call Control Server being loaded. Such a flag may also be part of the configuration information.

Furthermore, it might even be possible to check whether the originating subscriber is allowed to use a wideband codec (AMR-WB). For example, prepaid customers could be excluded.

Such information may be available in the Visiting Location Register (VLR) and may be retrieved by the Call Control Server (MSC 2). The Visiting Location Register (VLR) might be the same as the Visiting Location Register (VLR) for the originating terminal but could also be a different Visiting Location Register (VLR).

Then the terminating Call Control Server (MSC 2) has to select the best codec from the Supported Codec List (SCL) received from the originating Call Control Server (MSC 1) via the network, and the own Supported Codec List (tSCL).

As indicated in FIG. 1, there might be intermediate nodes, affecting the Supported Codec List (SCL) sent towards the terminating device. Hence, the Supported Codec List (SCL) might not necessarily be an identical copy of the Supported Codec List (oSCL) provided by the originating Call Control Server (MSC 1).

In the next step the codec to be used for the call has to be selected.

For this purpose, the two available Supported Codec Lists, i.e. the received Supported Codec List (SCL) and the internal Supported Codec List (tSCL) of the terminating node, needs to be analyzed.

The received Supported Codec List (SCL) will be addressed in the following as originating Supported Codec List (oSCL) although it might differ from the Supported Codec List (SCL) provided by the originating server as described above.

The analysis is performed according to table 2, which is organized in columns according to the support in the originating Supported Codec List (oSCL_sup) and the terminating Supported Codec List (tSCL_sup) and a first decision on the selected codec is found in the second last column and a second decision on the inclusion of the wideband codec (AMR-WB) in the available codec list is found in the last column.

If the originating Supported Codec List (oSCL_sup=direct) and the terminating Supported Codec List (tSCL_sup=yes) comprise a common wideband codec (AMR-WB) as a "Direct Codec", the common wideband codec (AMR-WB) is available end-to-end. Hence, the common wideband codec (AMR-WB) is selected for the call and included in an Available Codec List (ACL).

If only one of the Supported Codec Lists (tSCL,oSCL) comprises the wideband codec (AMR-WB) as a "direct codec" while the other supported codec lists comprises the wideband codec (AMR-WB) as an "indirect codec", said wideband codec (AMR-WB) is included in the available codec list (ACL) but not selected.

If both Supported Codec Lists (tSCL,oSCL) comprise the wideband codec (AMR-WB) as an "indirect codec" (oSCL_sup=indirect, tSCL_sup=indirect), said wideband codec (AMR-WB) is neither included in the available codec list (ACL) nor selected and the narrowband selection rules are applied and consequently a narrowband codec is selected.

If the originating Supported Codec Lists (oSCL) comprises the wideband codec (AMR-WB) as a "direct codec" (oSCL_sup=direct) and the wideband codec (AMR-WB) is apart from the default codec (PCM) the only codec supported by the originating Call Control Node (MSC 1) while the terminating Call Control Node (MSC 2) does not support the wideband codec (AMR-WB) at all, different operators may choose different solutions, i.e. either to select the default codec (PCM) which is known to result in higher transport bandwidth in the core network or to select the wideband codec (AMR-WB) which necessarily involves a transcoding leading to an inefficient use of processing resources as described above.

In any other case, i.e. the wideband codec (AMR-WB) is neither included as a "Direct Codec" nor as an "Indirect Codec" in one of the Supported Codec Lists (tSCL,oSCL), the wideband codec (AMR-WB) is neither selected nor included in the available codec list (ACL) and the narrowband selection rules are applied and consequently a narrowband codec is selected.

The Available Codec List (ACL) build according to the above analysis is then returned towards the originating node (MSC 1).

In doing so, the originating node (MSC 1) will receive knowledge on the capabilities of the terminating node (MSC 2) as will be described in the following.

In the following a handling of wideband Codecs in Nodes without Radio Access is described.

There are special cases that although the node (TSC) has no radio access and codec negotiation is terminated, inband information in wideband quality should be transported.

This is typically the case when a service (SRV) is invoked and a service related announcement is played.

Such a service (SRV) might be for example, a speaking clocking, advertising, phone polls, pricing information, etc.

If the operator has stored announcements in wideband quality, a wideband codec (AMR-WB) should be selected. In this case, the wideband codec (AMR-WB) is also included in the ACL.

Whether the Announcement is stored in narrowband quality or wideband quality might be retrieved from the header of the stored announcement or by a special suffix indicating that the message is stored in narrowband or wideband quality. Hence, the information might be received from the service (SRV).

Furthermore, another typical case is that an announcement is available only in narrowband, while the finally established call still has to achieve the best possible speech quality.

So although the announcement is provided in a narrowband quality, codec negotiation is restarted for the terminating call leg after the announcement and AMR-WB is still offered as it was received for the incoming codec negotiation.

If then finally the outgoing codec selection is terminated with AMR-WB, also the incoming call leg has to be modified by mid call procedures towards AMR-WB.

Another case is the voice mailbox that is capable of storing voice mail messages in wideband quality.

When a wideband codec (AMR-WB) call hits a voice mailbox, the wideband-codec (AMR-WB) is selected so that the voice message can be stored in wideband quality. Such a capability might be stored in configuration information related to the service.

When then the owner of the voice mailbox checks for messages, the voice mailbox can select narrowband or wideband codec depending on the format of the stored messages.

Hence, the node (TSC) may retrieve configuration information (SRV_sup), whether a service (SRV) supports a wideband codec (AMR-WB), wherein the information is received from the service (SRV).

Whether the media gateway (MGW) supports the wideband codec (AMR-WB), is known in the same manner as described above, i.e. the information is either provided by the operator or retrieved from the media gateway (MGW).

As already described, the information (SRV_sup), whether the Service (SRV) supports the wideband codec (AMR-WB), and the information (MGW_sup), whether a media gateway (MGW) supports the wideband codec (AMR-WB) is analyzed and in response to the analysis a supported codec list (oSCL,tSCL) is provided.

So far the methods described allow for setting-up a call. However, the mid-call handling of a wideband codec (AMR-WB) is supported by different knowledge.

As pointed out above, after call setup is completed and the call is established, the terminating Call Control Server (MSC 2) has knowledge on the capabilities of the originating Call Control Server (MSC 1), since it knows the (SCL), which is at least a subset of the codecs supported by the Call Control Server (MSC 1).

If the wideband codec (AMR-WB) is included in the supported coed list (SCL) as a "Direct Codec", the wideband codec (AMR-WB) is supported on the originating Call Control Server (MSC 1).

If the wideband codec (AMR-WB) is included in the supported coed list (SCL) as an "Indirect Codec", the wideband codec (AMR-WB) is not supported in the current radio access node (RAN 1).

If the wideband codec (AMR-WB) is not included in the supported coed list (SCL), the wideband codec (AMR-WB) is not possible for this call.

Furthermore, also the originating Call Control Server (MSC 1) may reconstruct from a previously sent supported codec list (SCL) and an available codec list (ACL) received in response to the sent supported codec list (SCL) knowledge on the capabilities of the terminating Call Control Server (MSC 2).

The reconstruction is performed according to table 3, which is organized in columns according to the sent codec in the supported codec list (SCL) originating from the internal provided supported codec list (oSCL), the codec selected for the call, the received codecs in the available codec list (ACL) and the reconstruction a subset of codecs available in the terminating node (MSC 2).

Apparently, the reconstruction may not reflect all capabilities of the terminating Call Control Server (MSC 2) since in the case that no wideband codec was included in the SCL sent by the originating Call Control Server (MSC 1) towards the terminating Call Control Server (MSC 2), the terminating Call Control Server will neither include a wideband codec in the available codec list nor select the wideband codec, even if the server could provide such functionality.

Furthermore, even if a wideband codec (AMR-WB) was included in the supported codec list (SCL), the terminating Call Control Server (MSC 2) may still not provide a wideband codec at all.

Hence, the originating as well as the terminating Call Control Server poses knowledge on the wideband capabilities of the other Call Control Server.

For this reason, any Call Control Server may start Midcall Codec negotiation with the aim of establishing a wideband codec (AMR-WB) for the call as soon as they notice that the wideband codec (AMR-WB) for the call would become available.

Assume the following situation. A first Call Control Server has the knowledge that it is capable of supporting a wideband codec (AMR-WB) as an indirect codec whereas the second Call Control Server is capable of supporting the wideband codec (AMR-WB) as a direct codec.

If now the wideband codec (AMR-WB) would become available in the first Call Control Server, for example due to a handover in the Radio Access Network, the first Call Control Server could determine by means of the knowledge of the second Call Control Server that the wideband codec (AMR-WB) would become available End-To-End or as a "direct codec".

Since, it is the goal to provide the superior speech quality when ever possible, such a codec re-negotiation could be started.

For the purpose of the codec re-negotiation, the first Call Control Server builds a new Supported Codec List (SCL) as described above and sends the newly build Supported Codec List (SCL) towards the second Call Control Server.

In second Call Control Server will then select a codec, since the own supported codec list needs not to be updated and returns a newly build available codec list (ACL).

If, however, the situation would be vice-versa, i.e. a wideband codec (AMR-WB) was selected for the call and consequently also included in the available codec list (ACL) and would become unavailable in the first Call Control Server, for example due to a handover in the Radio Access Network, the Call Control Server performing the handover or relocation shall initiate a mid-call codec negotiation procedure in order to change the call to a narrowband codec.

The same procedures and the same logic as involved at call setup could be applied. However, now the newly available radio access node does not support the wideband codec (AMR-WB), consequently the wideband codec (AMR-WB) will not be chosen for the call, but any narrowband codec.

As will be appreciated, the invention as described above allows for using superior speech codecs (AMR-WB) in all cases where the superior speech quality can be achieved, i.e. the codec usage in an end-to-end manner.

In all other cases, the use of such codecs is suppressed in order to save processing power required for the (de-)coding.

Devices adapted to perform the above methods, typically comprise several means which are internally connected to each other or integrated into each other. Individual devices may be adapted to perform one or more of the above described methods.

Figure 2:
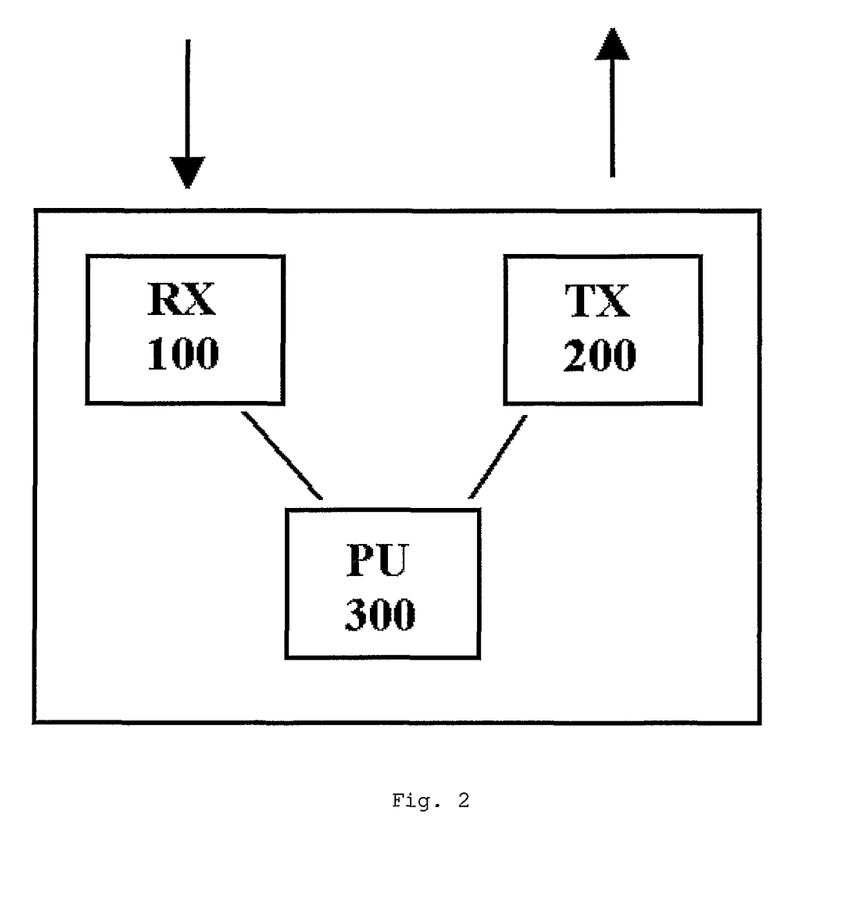
FIG. 2 shows a device according to the invention.

With reference to FIG. 2, such devices typically comprise a means for receiving (100) such as a receiver. These means may be adapted to receive a call set up signaling, and/or to receive a supported codec list from an originating or an intermediate node.

Furthermore, such devices may comprise a means for retrieving configuration information or retrieving information (300), such as a processing unit.

In addition, such devices may comprise means for analyzing (300) information such as a processing unit. These means may be adapted to analyzing information, whether a terminal supports the wideband codec, the configuration information, whether a Radio Access Node supports the wideband codec, and the information, whether a media gateway supports the wideband codec. Furthermore, these means may be adapted to analyze a received supported codec list and provided supported codec list Furthermore, such devices may comprise a means for providing (300) a supported codec list and/or available codec list such as a processing unit.

Still further, such devices may comprise means for sending (200) such as a transmitter. These means may be adapted to send a provided supported codec list towards another node, such as an intermediate or a terminating node. Also these means may be adapted to send a provided available codec list (ACL) towards the originating node.

Additionally, such devices may comprise a means for selecting (300) a codec such as a processing unit.

In addition, such devices may comprise also means for reconstructing (300) a supported codec list such as a processing unit.

Moreover, such devices may comprise also means for detecting (300) a change in the setup, such as a processing unit.

As will be appreciated, the methods described above could also be implemented as software adapted to perform the aforementioned methods when run on a programmable device.

As described above, the handling is build on top of the standardized OoBTC procedures, incorporating the enhancements of latest technologies such as the structured Supported Codec List (SCL) as previously invented.

LIST OF ABBREVIATIONS

ACL Available Codec List
AMR Adaptive Multi Rate
AMR-WB AMR Wideband
SCL Supported Codec List
SC Selected Codec
oSCL originating Supported Codec List
tSCL terminating Supported Codec List
CN Core Network
MGC Media Gateway Controller
MGW Media Gateway
F.E. Functional Entity
MS Mobile Station
TE Terminal Equipment BSC Base Station Controller
MSC Mobile Switching Center
TSC Transit Switching Center

TABLE 1

| TE_sup | RAN_sup | MGW_sup | SCL/oSCL/tSCL |
|---|---|---|---|
| yes | yes | yes | AMR-WB is direct codec |
| yes | no | yes | AMR-WB is indirect codec |
| no | yes | yes | AMR-WB not included |
| no | no | yes | AMR-WB not included |
| any | any | no | AMR-WB not included |

TABLE 2

| oSCL_sup | tSCL_sup | Selected Codec | ACL |
|---|---|---|---|
| Direct | Direct | AMR-WB selected | AMR-WB included |
| Direct | Indirect | AMR-WB not selected | AMR-WB included |
| Indirect | Direct | AMR-WB not selected | AMR-WB included |
| Indirect | Indirect | AMR-WB not selected | AMR-WB not included |
| no AMR-WB | any | AMR-WB not selected | AMR-WB not included |
| any | no AMR-WB | AMR-WB not selected | AMR-WB not included |
| Direct | no AMR-WB | operator specific | operator specific |

TABLE 3

| Sent in oSCL | Selected Codec for the call | Received in ACL | Reconstructed tSCL |
|---|---|---|---|
| AMR-WB is Direct Codec | AMR-WB | AMR-WB | AMR-WB supported |
|  | any narrowband codec | AMR-WB | AMR-WB is not supported in the current radio access node |
|  | any narrowband codec | no AMR-WB | no AMR-WB support |
| AMR-WB is Indirect Codec | any narrowband codec | AMR-WB | AMR-WB supported |
|  | any narrowband codec | no AMR-WB | no AMR-WB support |
| AMR-WB not included | since AMR-WB is not included in SCL, it can never be selected, nor returned in ACL. AMR-WB is not possible for this call. | | |

The invention claimed is:

1. A method for providing a supported codec list of a Call Control Server when setting up a call, the method comprising the steps of:
   receiving information regarding whether a terminal supports a wideband codec,
   retrieving configuration information regarding whether a Radio Access Node supports the wideband codec,
   retrieving information regarding whether a media gateway supports the wideband codec,
   analyzing the information regarding whether the terminal supports the wideband codec, the configuration information regarding whether the Radio Access Node supports the wideband codec, and the information regarding whether the media gateway supports the wideband codec, and in response to the analysis, providing the supported codec list,
   including the wideband codec as a direct codec in the supported codec list if the wideband codec is supported by the terminal, the media gateway, and the Radio Access Node, and
   including the wideband codec as an indirect codec in the supported codec list if the wideband codec is supported by the terminal and the media gateway and not by the Radio Access Node,
   wherein the wideband codec is selected for the call only if the wideband codec is included as a direct codec in the supported codec list and can be used end-to-end without any narrowband link in a call path of the call.

2. The method according to claim 1, wherein the method further comprises the steps of:
   retrieving from a database information regarding whether a subscriber is allowed to use the wideband codec, and
   using the information regarding whether the subscriber is allowed to use the wideband codec, in the analysis.

3. The method according to claim 1, wherein the method further comprises the steps of:
   retrieving configuration information regarding whether usage of the wideband codec is temporally disallowed, and
   using the information regarding whether the usage of the wideband codec is temporally disallowed, in the analysis.

4. The method according to claim 1, wherein the method further comprises the steps of:
   sending the provided supported codec list to a terminating or an intermediate node.

5. The method according to claim 1, wherein the method further comprises the steps of:
   receiving a supported codec list from an originating or an intermediate node.

6. The method according to claim 1, wherein the method is provoked by a received supported codec list from an originating or an intermediate node.

7. A method for returning an available codec list for setting up a call or mid-call codec negotiation, the method comprising the steps of:
   receiving a supported codec list from an originating or an intermediate node,
   providing a supported codec list by performing the following steps:
      receiving information regarding whether a terminal supports a wideband codec,
      retrieving configuration information regarding whether a Radio Access Node supports the wideband codec,
      retrieving information regarding whether a media gateway supports the wideband codec, and
      analyzing the information regarding whether the terminal supports the wideband codec, the configuration information regarding whether the Radio Access Node supports the wideband codec, and the information regarding whether a media gateway supports the wideband codec, including the wideband codec as a direct codec in the provided supported codec list if the wideband codec is supported by the terminal, the media gateway, and the Radio Access Node, including the wideband codec as an indirect codec in the provided supported codec list if the wideband codec is supported by the terminal and the media gateway and not by the Radio Access Node, analyzing the received supported codec list and the provided supported codec list, in response to the analysis of the received supported codec list and the provided supported codec list, selecting a codec and providing the available codec list, and returning the available codec list towards the originating node, wherein the wideband codec is selected for the call only if the wideband codec is included as a direct codec in both supported codec lists and can be used end-to-end without any narrowband link in a call path of the call.

8. The method according to claim 7, wherein, the wideband codec can be used end-to-end without any narrowband link in the call path if both supported codec lists comprise the wideband codec as a direct codec.

9. The method according to claim 7, wherein if only one of the supported codec lists comprises the wideband codec as a direct codec while the other supported codec list comprises the wideband codec as an indirect codec, said wideband codec is included in the available codec list but is not selected.

10. A method for mid-call codec handling in a first node, the node being connected to a second node in an ongoing call, the method comprising the steps of:

providing a first supported codec list of the first node, by performing the following steps:

receiving information regarding whether a terminal supports a wideband codec, retrieving configuration information regarding whether a Radio Access Node supports the wideband codec, retrieving information regarding whether a media gateway supports the wideband codec, and analyzing the information regarding whether the terminal supports the wideband codec, the configuration information regarding whether the Radio Access Node supports the wideband codec, and the information regarding whether a media gateway supports the wideband codec, including the wideband codec as a direct codec in the first supported codec list if the wideband codec is supported by the terminal, the media gateway, and the Radio Access Node, including the wideband codec as an indirect codec in the first supported codec list if the wideband codec is supported by the terminal and the media gateway and not by the Radio Access Node, and in response to the analysis providing said first supported codec list, whereby the first supported codec list comprises the wideband-codec:

receiving or reconstructing a second supported codec list of the second node, detecting a change that the wideband codec would become available or unavailable as a direct codec in an end-to-end connection, providing a new supported codec list including the wideband codec if available, and sending the new supported codec list towards the second node, wherein the wideband codec is selected for the ongoing call only if the wideband codec can be used end-to-end without any narrowband link in a call path of the call.

11. The method according to claim 10, wherein the first node is an originating node, the second node is a terminating node, and the second supported codec list is reconstructed from the previously sent supported codec list and an available codec list received in response to the sent supported codec list.

12. A device adapted to perform a codec negotiation when setting up a call, the device comprising:

means for receiving information regarding whether a terminal of a subscriber involved in the call supports a wideband codec, means for retrieving configuration information regarding whether a Radio Access Node supports the wideband codec and information regarding whether a media gateway supports the wideband codec, means for analyzing the information regarding whether the terminal supports the wideband codec, the configuration information regarding whether the Radio Access Node supports the wideband codec, and the information regarding whether a media gateway supports the wideband codec, and means for providing in response to the analysis, a supported codec list including the wideband codec if supported, wherein the wideband codec is included as a direct codec in the supported codec list if the wideband codec is supported by the terminal, the media gateway, and the Radio Access Node, wherein the wideband codec is included as an indirect codec in the supported codec list if the wideband codec is supported by the terminal and the media gateway and not by the Radio Access Node, and wherein the wideband codec is selected for the call only if the wideband codec can be used end-to-end without any narrowband link in a call path of the call.

13. The device according to claim 12, whereby the device further comprises:

means for sending the provided supported codec list towards another node, including an intermediate or a terminating node.

14. The device according to claim 12, whereby the device further comprises:

means for receiving a supported codec list from an originating or an intermediate node.

15. A device adapted to return an available codec list for setting up a call or mid-call codec negotiation, the device comprising:

means for receiving a supported codec list from an originating or an intermediate node, means for receiving information regarding whether a terminal of a subscriber involved in the call supports a wideband codec, means for retrieving configuration information regarding whether a Radio Access Node supports the wideband codec, and information regarding whether a media gateway supports the wideband codec, means for analyzing the information regarding whether the terminal supports the wideband codec, the configuration information regarding whether the Radio Access Node supports the wideband codec, and the information regarding whether a media gateway supports the wideband codec, means for providing in response to the analysis an own supported codec list, wherein the wideband codec is included as a direct codec in the own supported codec list if the wideband codec is supported by the terminal, the media gateway, and the Radio Access Node, and wherein the wideband codec is included as an indirect codec in the own supported codec list if the wideband codec is supported by the terminal and the media gateway and not by the Radio Access Node, means for analyzing the received supported codec list and the own provided supported codec list, means for selecting a codec, means for providing an available codec list including a supported wideband codec, and means for sending the provided available codec list towards the originating node, wherein the wideband codec is selected for the call only if the wideband codec can be used end-to-end without any narrowband link in a call path of the call.

16. A device adapted to perform a mid-call codec negotiation, whereby the device is logically connected to a second device in an ongoing call, the device comprising:

means for receiving information regarding whether a terminal of a subscriber involved in the call supports a wideband codec, means for retrieving configuration information regarding whether a Radio Access Node supports the wideband codec, and information regarding whether a media gateway supports the wideband codec, means for analyzing the information regarding whether the terminal supports the wideband codec, the configuration information regarding whether the Radio Access Node supports the wideband codec, and the information regarding whether a media gateway supports the wideband codec, means for providing in response to the analysis a first supported codec list, whereby the first supported codec list comprises the wideband-codec, wherein the wideband codec is included as a direct codec in the first supported codec list if the wideband codec is supported by the terminal, the media gateway, and the Radio Access Node, and wherein the wideband codec is included as an indirect codec in the first supported codec list if the wideband codec is supported by the terminal and the media gateway and not by the Radio Access Node, means for receiving or reconstructing a second supported codec list of the second device, means for detecting that the wideband codec would become available or unavailable as a direct codec in an end-to-end connection, means for providing a new supported codec list including the wideband codec if available, and means for sending the new supported codec list towards the second device, wherein the wideband codec is selected for the ongoing call only if the wideband codec can be used end-to-end without any narrowband link in a call path of the call.

17. The method of claim 7, wherein the received supported codec list and the provided supported codec list each comprise a common wideband codec and the common wideband codec is selected for the call.

* * * * *

UNITED STATES PATENT AND TRADEMARK OFFICE
CERTIFICATE OF CORRECTION

PATENT NO. : 9,584,574 B2  
APPLICATION NO. : 12/281459  
DATED : February 28, 2017  
INVENTOR(S) : Witzel et al.

It is certified that error appears in the above-identified patent and that said Letters Patent is hereby corrected as shown below:

In Column 3, Line 49, delete "send" and insert -- sent --, therefor.

In Column 4, Line 7, delete "speech" and insert -- speech wideband --, therefor.

In Column 8, Line 55, delete "coed" and insert -- codec --, therefor.

In Column 8, Line 59, delete "coed" and insert -- codec --, therefor.

In Column 8, Line 63, delete "coed" and insert -- codec --, therefor.

In Column 10, Line 26, delete "list" and insert -- list. --, therefor.

Signed and Sealed this  
Sixth Day of June, 2017

Michelle K. Lee  
*Director of the United States Patent and Trademark Office*